United States Patent
Rangarajan et al.

(10) Patent No.: US 8,223,649 B2
(45) Date of Patent: Jul. 17, 2012

(54) METHOD AND APPARATUS FOR SENDING A PACKET FROM A SOURCE NODE TO A DESTINATION NODE IN THE SAME BROADCAST DOMAIN

(75) Inventors: Anand Rangarajan, Beaverton, OR (US); W. Steven Conner, Portland, OR (US)

(73) Assignee: Intel Corporation, Santa Clara, CA (US)

(*) Notice: Subject to any disclaimer, the term of this patent is extended or adjusted under 35 U.S.C. 154(b) by 255 days.

(21) Appl. No.: 12/055,242

(22) Filed: Mar. 25, 2008

(65) Prior Publication Data
US 2009/0245243 A1 Oct. 1, 2009

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ...................................................... 370/238
(58) Field of Classification Search .................. 370/389, 370/395.52, 395.21, 395.43, 351
See application file for complete search history.

(56) References Cited

U.S. PATENT DOCUMENTS

| | | | | |
|---|---|---|---|---|
| 2003/0147400 A1* | 8/2003 | Devi | ........................ | 370/395.21 |
| 2003/0202511 A1* | 10/2003 | Sreejith et al. | ................. | 370/389 |
| 2004/0151136 A1* | 8/2004 | Gage | ............................. | 370/328 |
| 2007/0030826 A1* | 2/2007 | Zhang et al. | ................... | 370/331 |
| 2007/0168563 A1* | 7/2007 | Jha et al. | ........................ | 709/250 |
| 2008/0137669 A1* | 6/2008 | Balandina et al. | ............. | 370/400 |
| 2008/0198814 A1* | 8/2008 | Wengerter et al. | ............. | 370/336 |
| 2009/0037999 A1* | 2/2009 | Anderson et al. | ................ | 726/12 |
| 2009/0046842 A1* | 2/2009 | Allen et al. | ............... | 379/201.01 |

OTHER PUBLICATIONS

DLNA, Digital Living Network Alliance; DLNA Overview and Vision Whitepaper 2007, pp. 23.
Homeplug Powerline Alliance, Inc., HomePlug AV White Paper, 2005, Document version No. HPAVWP-050818. pp. 1-11.
Microsoft Corporation, Microsoft Windows, A Window Rally Specification, "LLTD: Link Layer Topology Discovery Protocol", version 1.0.9—Sep. 15, 2006. pp. 63.
David C. Plummer, Network Working Group, Requests for Comments: 826, "An Ethernet Address Resolution Protocol—or—Converting Network Protocol Addresses to 48.bit Ethernet Address for Transmission on Ethernet Hardware", Nov. 1982, pp. 10.
UPnP Forum, "UPnP Device Architecture 1.0", Document Revision Date Jul. 20, 2006, pp. 80.
IEEE Computer Society, "Part 11: Wireless LAN Medium Access Control (MAC) and Physical Layer (PHY) Specifications", IEEE Std 802.11-2007 (Revision of IEEE std 802.11-1999), IEEE, 3 Park Avenue, New York, NY 10016-5997, USA, Jun. 12, 2007, pp. 1232.

(Continued)

*Primary Examiner* — Huy D Vu
*Assistant Examiner* — Adnan Baig
(74) *Attorney, Agent, or Firm* — Christopher K. Gagne

(57) ABSTRACT

A method of sending a packet from a source node to a destination node in the same broadcast domain. The packet is associated with a traffic flow directed from the source node to the destination node. The source node is connected with the destination node via a first and a second communication path. A criterion based on an attribute of the traffic flow is measured for each of the communication paths. One path is selected between the first and second communication paths based on the measured criterion and the selected communication path is assigned to the associated traffic flow. The packet is then sent via the selected communication path.

26 Claims, 6 Drawing Sheets

OTHER PUBLICATIONS

American National Standard (ANSI), "Part 5: Media Access Control (MAC) Bridging of Ethernet V2.0 in Local Area Networks", IEEE Std 802.1H, 1997 Edition (R2001), pp. 26.

IEEE Computer Society, "Part 15.1: Wireless medium access control (MAC) and physical layer (PHY) specifications for wireless personal area networks (WPANs)", IEEE Std 802.15.1-2005 (Revision of IEEE Std 802.15.1-2002), IEEE, 3 Park Avenue, New York, NY 10016-5997, USA, Jun. 14, 2005, pp. 600.

IEEE Computer Society, "Virtual Bridged Local Area Networks", IEEE Std 802.1Q-2005, (Incorporates IEEE Std 802.1Q-1998, IEEE Std 802.1u-2001, IEEE Std 802.1v-2001, and IEEE Std 802.1s-2002), IEEE, 3 Park Avenue, New York, NY 10016-5997, USA, May 19, 2006, pp. 303.

* cited by examiner

METHOD AND APPARATUS FOR SENDING A PACKET FROM A SOURCE NODE TO A DESTINATION NODE IN THE SAME BROADCAST DOMAIN

BACKGROUND

1. Field

This invention relates to computer networking, and more specifically but not exclusively, to allow the dynamic simultaneous use of network connections among network nodes in the same broadcast domain.

2. Background Description

Video content distribution is getting more pervasive and it opens the opportunity for new applications and services. In certain circumstances, such as video to the home, this will require an easy to set-up and use, robust home network that provides full coverage throughout the home and serves multiple uses including video entertainment, gaming, music, photo sharing, traditional data communications, access to home automation gateways, Internet access, voice and video communications. A number of Radio Frequency (RF) based network technologies such as Institute of Electrical and Electronics Engineers (IEEE) wireless standard family 802.11, Home Plug AV (HPAV) and Ultra Wide Band (UWB) are targeting this usage model. Technical and market factors such as variable performance of individual link technologies across different topologies, home floor plans, and preference of particular technologies by different device vendors suggest that a multitude of these technologies are likely to co-exist in a bridged home Local Area Network (LAN), rather than one single technology dominating all future networks. High-end end-user devices may ship with multiple network interfaces such as 802.11n, UWB, and Ethernet whereas low cost end-user devices may include only a single interface such as 802.11n or HPAV based on vendor preference. To ensure interoperability between devices in such a hybrid network topology, access points and bridges are manufactured and sold to interconnect these heterogeneous links into a single bridged network for example, in support of the Digital Living Network Alliance (DLNA) industry consortium.

Although bridges allow the interconnection of different end-user devices with heterogeneous link technologies, existing standards and network stack implementations on end-user devices typically limit the end-user devices to utilize only a single connection or interface to the bridged LAN. However, future home network devices will likely have multiple interfaces available to connect to the home network. For example, a streaming media server such as an Intel® Viiv™ server may have a choice between 802.11n and Power Line (HPAV) to connect to the bridged LAN.

The network stack in most computer systems today is not capable of leveraging the benefit of having multiple network interfaces connected to the same bridged LAN. The default configuration in most computer systems such as Windows and Linux systems is to enable Transmission Control Protocol/Internet Protocol (TCP/IP) on all interfaces and use Dynamic Host Configuration Protocol (DHCP) to acquire an Internet Protocol (IP) address and other configuration information from a server on the network. When multiple interfaces are detected as being connected to the same LAN subnet, only one of the network interfaces is automatically chosen as the primary interface and used for all communication. The other interfaces are left unused even though they are still connected to the network. This is a fundamental limitation imposed by the way network stacks are implemented today because it allows only one interface to connect actively to a particular subnet.

BRIEF DESCRIPTION OF THE DRAWINGS

The features and advantages of embodiments of the invention matter will become apparent from the following detailed description of the subject matter in which.

DETAILED DESCRIPTION

Reference in the specification to "one embodiment" or "an embodiment" of the invention means that a particular feature, structure or characteristic described in connection with the embodiment is included in at least one embodiment of the invention. Thus, the appearances of the phrase "in one embodiment" appearing in various places throughout the specification are not necessarily all referring to the same embodiment.

Embodiments of the invention overcome the fundamental limitation imposed by the existing network stacks to allow more than one interface in a network node to connect actively and simultaneously to a particular broadcast domain. A broadcast domain is a logical network segment in which any computer or other device connected to the network can directly transmit to any other on the same domain without having to go through a routing device when they share the same subnet address. The broadcast domain includes repeaters or transparent bridges that do not alter any data that is transferred. A network node includes, but is not limited to, a server, a client, a mobile device, or any device that contains a network card interface (NIC) to connect to the broadcast domain.

Figure 1:
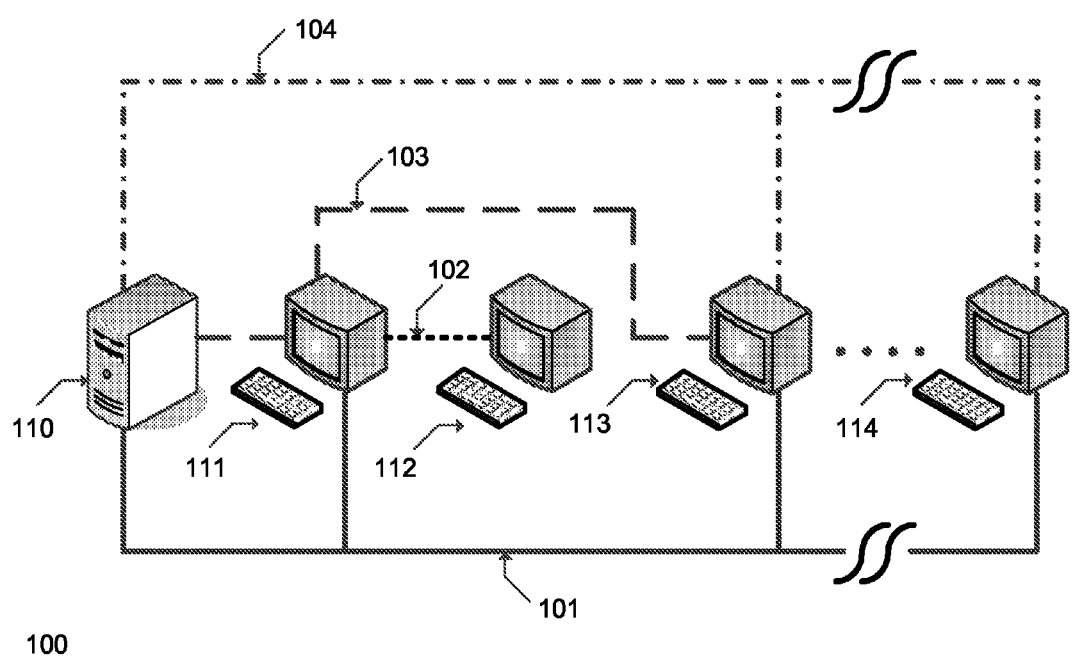
FIG. 1 shows one example of a networking system where a source node is connected to multiple destination nodes via multiple network connections in the same broadcast domain.

As depicted in FIG. 1, an embodiment of a networking system 100 of the invention includes one or more servers 110 and one or more clients 111, 112, and 113 in the same broadcast domain. Client 114 shows that there can be any number of clients connected with the server. Each client is connected with the server 110 through different connections simultaneously. Client 111 is connected with the server 110 via UWB 101 and via IEEE 802.11n 103. Client 113 is connected with the server 110 via UWB 101, via HPAV 104, and with client 111. If client 111 is transparent, the client 113 will be connected with the server 110 directly via 802.11n 103. Client 112 is connected with client 111 via Bluetooth 102. The client includes, but is not limited to, a computer, an access point, a bridge, a personal handheld computer, or any machine that can be connected with a server. It is known to one skilled in the relevant art that there can be other communication paths between the server 110 and the clients 111, 112, and 113. The communication paths include, but are not limited to, UWB, 802.11 family, HPAV, Bluetooth, Ethernet, optical fiber and any wired or wireless means of communication between the server 110 and the clients 111, 112, and 113. In the networking system 100, the server 110 can determine the optimal path among the various network connections 101, 102, 103 and 104 for communication with clients 111, 112, and 113.

Figure 2:
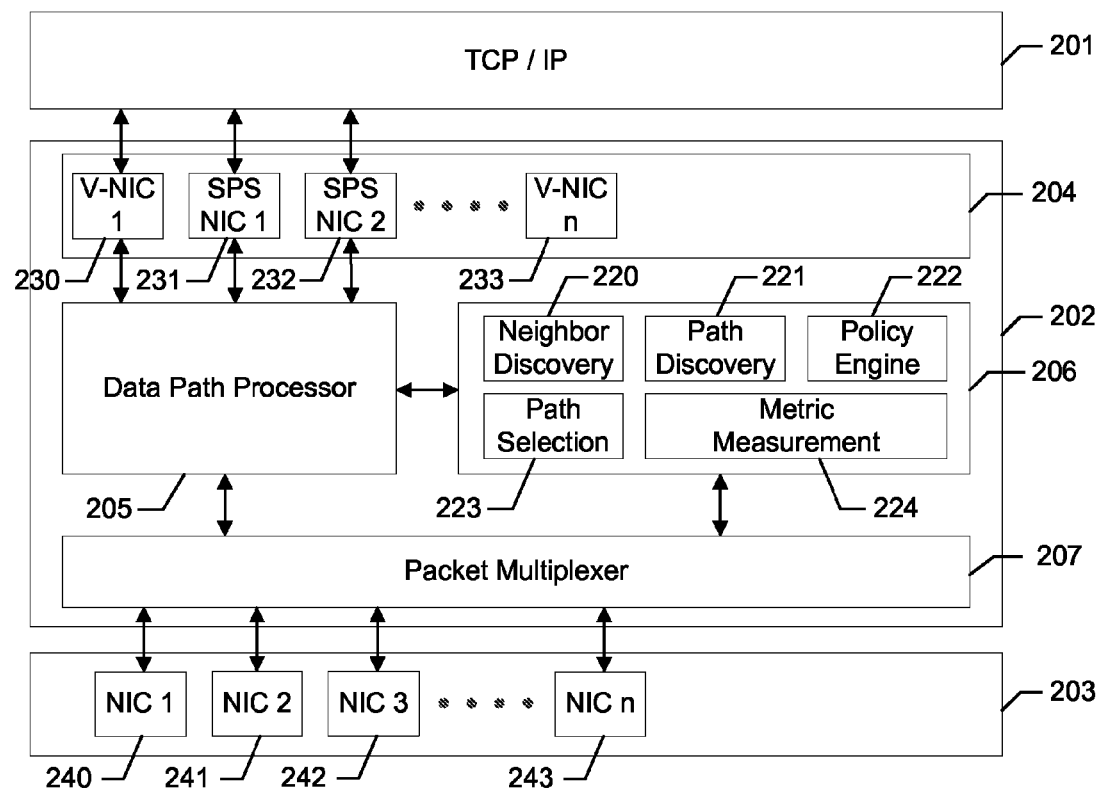
FIG. 2 illustrates the major components in a network stack, in accordance with an embodiment of the invention.

FIG. 2 shows one embodiment of the invention where an existing network stack 200 in the server 110 or the clients 111, 112, and 113 is modified to implement the networking system 100 described in FIG. 1. There is an intermediate layer called a Smart Path Selection (SPS) layer 202 that is added in-between layer two, which is the network interface 203, and the higher layers three and above, depicted as TCP/IP 201. The network layer 203 includes one or more Network Interface Cards (NIC) 240, 241, and 242. NIC 243 shows that there can be any number of NICs. The NICs represent the communication paths between the server 110 and the clients 111, 112 and 113. NIC 240, for example, represents the UWB connection 101 in FIG. 1.

The SPS layer 202 contains four main blocks. The first block is the SPS-TCP/IP interface block 204. This block serves as the interface between TCP/IP layer 201 and the SPS layer 202. The SPS TCP/IP interface block 204 consists of two different types of NICs. The first type of NIC is a Virtual NIC (V-NIC) as depicted in element 230. V-NIC n 233 shows that there can be more than one V-NIC in the SPS-TCP/IP block. A V-NIC is a pseudo NIC that appears as a regular physical NIC to the TCP/IP layer 201. Each V-NIC corresponds to one physical NIC. The second type of NIC is a SPS NIC as depicted in elements 231 and 232. A SPS NIC is also a pseudo NIC that appears as a regular physical NIC to the TCP/IP layer 201. The SPS NIC is similar to a V-NIC, but it is associated with at least two physical NICs. Any data that is sent by the TCP/IP layer through the SPS NIC will be subjected to the SPS Layer logic to determine the optimal path to the destination that goes through one or more of the associated NICs. Subsequently, the data will be sent on the physical interface(s) that belongs to the optimal path. In contrast, data sent by the TCP/IP layer 201 through a V-NIC is not subjected to SPS layer logic and is sent directly on the corresponding physical interface.

Both V-NIC 230 and SPS NIC 231 provide the same interface to the TCP/IP stack 201 as a regular physical NIC. Therefore, the SPS TCP/IP interface block 204 makes the SPS layer 202 transparent to higher layer protocols and applications. It allows the SPS layer 202 to be implemented in the server 110 or clients 111, 112, and 113 without requiring changes to any existing applications.

The second block in the SPS layer 202 is the data path processor 205. The data path processor 205 distinguishes the data packets from the TCP/IP 201 that require further processing for smart path selection. Data packets sent by TCP/IP 201 through any of the V-NICs 230 are sent through the corresponding physical NIC 240 without any processing. However, data packets sent through the SPS NIC 231 will undergo further processing. For each of these packets sent through SPS NIC, the data path processor 205 will analyze the header of the packets to determine the source and destination port number. The Internet Assigned Numbers Authority (IANA) defines the official usage for the port numbers. The well known ports are from 0 to 1023 and it includes well-known ports like port 20 for File Transfer Protocol (FTP) data packets, port 25 for Simple Mail Transfer Protocol (SMTP) for email packets and port 80 for HyperText Transfer Protocol (HTTP) for transferring web pages.

With the port information, the data path processor assigns the packets to a traffic flow. For example, the data path processor can examine the source port number and obtain a port number of 20. It assigns the packets with port number 20 to a FTP-related data traffic flow as port number 20 belongs to FTP. In another example, the data path processor can examine the source port number and obtain a port number of 25. It assigns the packets with port number 25 to an email traffic flow. The different types of traffic flow include, but are not limited to, voice, video, data, email, or any type of classification that distinguishes the requirement of the traffic flow. The data path processor determines the egress physical interface and the destination MAC address by doing a lookup in a data path forwarding table that is programmed by the control block 206. If the data path processor 205 is unable to find a match in the table, it will trigger the control block 206 to create an appropriate entry in the table for the packet. If the lookup is successful, the destination MAC address in the packet is replaced with the MAC address determined and the packet is transmitted over the egress interface determined. The data path processor 205 also processes data packets that are received from the network layer 203. These packets are delivered to the TCP/IP 201 through the appropriate V-NIC 230 or SPS NIC 231 based on the destination IP address in the packet.

The third block in the SPS layer 202 is the control block 206. The control block 206 contains five modules. The first module is the neighbor discovery module 220. This module discovers all the available nodes in the networking system 100 that is reachable using only header information below layer three in the data packet. For example, two nodes connected to the same broadcast domain such as Ethernet LAN segment or transparent bridged LAN are considered to be neighbors. Transparent devices such as layer two bridges and access points only need to process information available at layer two. Therefore, two devices connected through one or more transparent devices are also considered to be neighbors.

The second module in the control block 202 is the path discovery module 221. The path discovery module 221 discovers all available paths or a subset of available paths between a source node and a destination node in the networking system 100. The path discovery module discovers paths when the source and the destination node are neighbors and also when the destination node has to be reached through a series of hops through other systems in the network.

The third module in the control block 202 is the policy engine module 222. The policy engine 222 selects the performance criterion for choosing the optimum path to send a packet from the source to the destination node. In one embodiment for example, the policy engine is set with a policy for optimizing performance. In order to optimize for performance, the policy engine selects performance criterion for File Transfer Protocol (FTP) traffic to maximize throughput and for Voice over Internet Protocol (VoIP) traffic to minimize, or to maintain a low latency. The performance criterion includes, but is not limited to, available bandwidth, low latency, maximum throughput, Quality of Service (QoS) and other means of measuring the performance of a communication link. The policy for the policy engine includes, but is not limited to, optimize for performance, battery conservation, and other means of defining the usage of the node. The performance criterion is used to enable the network 100 to balance the load of egress traffic at layer two using multiple communication paths for improved network capacity and QoS.

The fourth module in the control block 202 is the metric measurement module 224. This module measures the performance criterion selected in the policy engine 222. The criterion is measured between the source and destination node of the packet along each path discovered by the path discovery module 221. For example, when the data path processor 205 assigns voice packets to a voice traffic flow, the policy engine 222 will select the performance criteria to be low latency in order to minimize dropped calls. The metric measurement module 224 measures the latency of each path from the source to the destination node that is found by the path discovery module 221.

The fifth module in the control block 202 is the path selection module 223. From a list of available paths between a source and a destination obtained from the path discovery module 221 and the measured results from the metric measurement module 224, the path selection module 223 selects one or more paths that are the best candidates for satisfying the performance criterion selected by the policy engine 222. The path selection module 223 sets up the state information in a data path forwarding table. The state information includes, but is not limited to, a destination IP address, an IP protocol, a source port, a destination port, an optimum path, a reverse optimum path and any other information that is pertinent to the delivery of the packet. It also sets up state information in other intermediate nodes between the source and destination node so that the path that satisfies the performance criterion gets established end-to-end. In addition, it sets up the reverse path from the destination to the source node to enable bidirectional communication between the source and the destination node. This data path forwarding table is used by the data path processor 205 for sending the data packet using the path selected by the path selection module 223.

The fourth block in the SPS layer 202 is the packet multiplexer 207. The packet multiplexer sends and receives data and control packets from the NICs in the network interface 203. The data packets are transferred to the data path processor 205 and the control packets are transferred to the control block 206. Arrows depicted in FIG. 2 represent both data and control packet flow.

Figure 3:
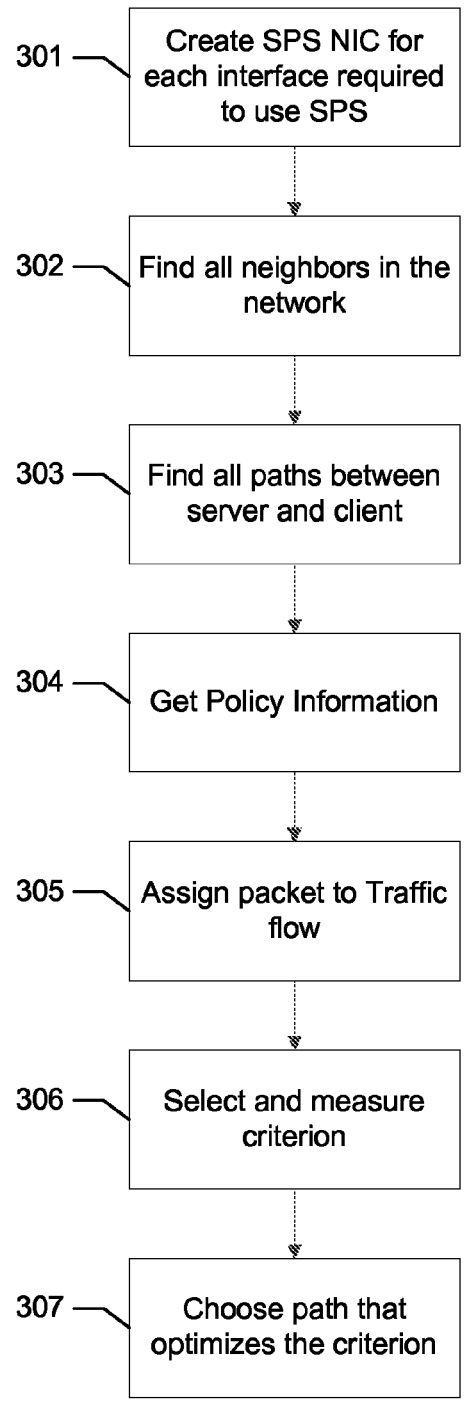
FIG. 3 is a flowchart according to an embodiment of the invention.

FIG. 3 illustrates the flow chart 300 for the main steps of one embodiment of the invention. In step 301, the SPS-TCP/IP block creates a SPS NIC for each interface that requires smart path selection and a VIC-NIC for each interface that does not require smart path selection. Once the SPS NIC is created, the neighbor discovery module 220 looks for all the neighbors for the server 110 and the clients 111, 112 and 113 in the networking system 100 in step 302. With the information of all the neighbors, the path discovery module 221 looks for all the possible paths between the server 110 and clients 111, 112 and 113 in step 303. In step 304, the policy information is obtained from the policy engine 222 to select the performance criterion. The traffic flow of the data packet is then assigned in step 305 by the data path processor 205. The traffic flow is determined from the information specified in the packet header as described earlier. Using the assigned traffic flow of the packet and the relevant criterion selected by the policy engine 222, the metric measurement module 224 measures the criterion for each path discovered by the path discovery module 221 in step 306. The path that optimizes the chosen criterion is then selected in step 307 by the path selection module 223. Detailed workings of these steps are illustrated in FIGS. 4, 5a and 5b.

Figure 4:
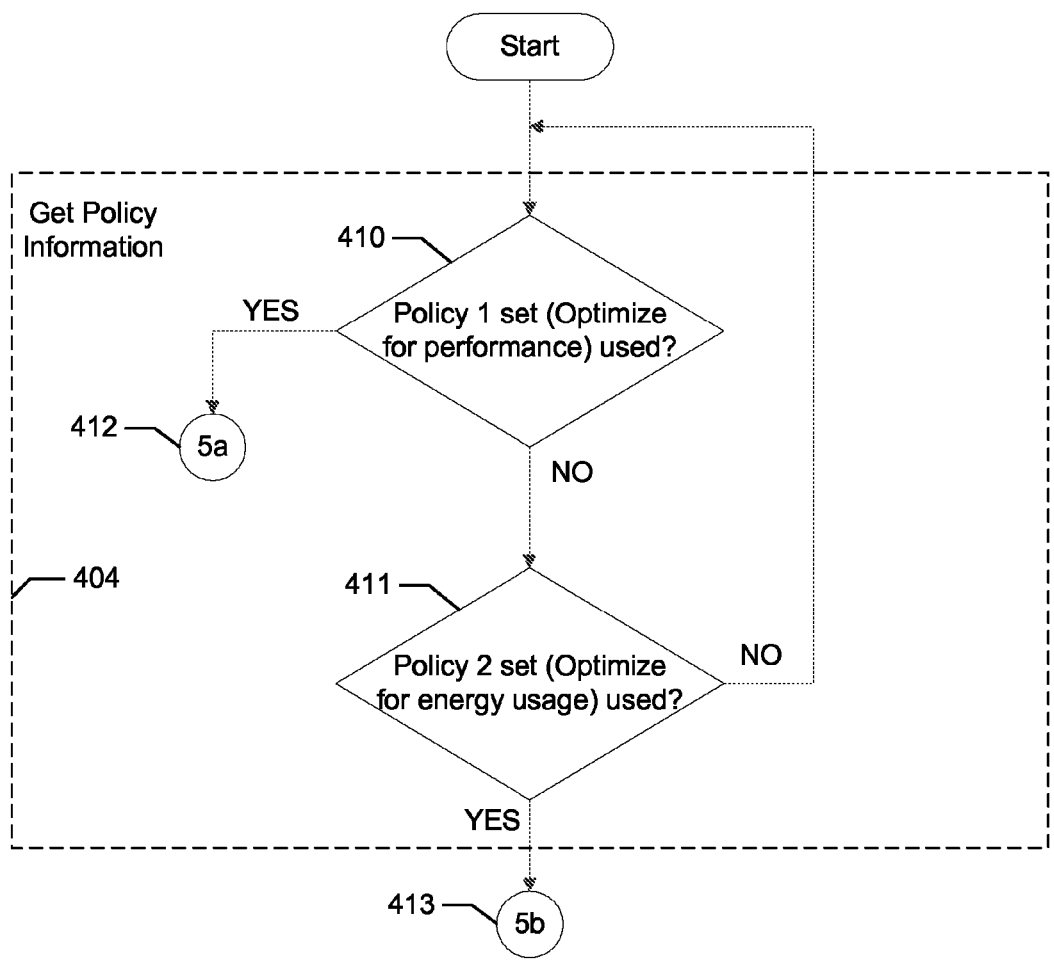
FIG. 4 is a flowchart according to an embodiment of the invention.

FIG. 4 shows an embodiment of two different scenarios of the networking system 100. In this illustration, a machine with four kinds of network interfaces available, namely Ethernet, HPAV, UWB and 802.11n, has the SPS layer 202 implemented in its network stack 200. All the four interfaces can be enabled for smart path selection depending on the scenario and a SPS NIC is created for each interface that requires smart path selection. Flowchart 400 shows one embodiment of how the policy information 304 is obtained. Policy set 1 410 illustrates one scenario when the machine is connected to a power outlet and has all four interfaces connected in the network 100. Policy set 1 410 is set for optimization for performance. When policy set 1 410 is set, it follows the path 5a 412. If policy set 1 410 is not set, the SPS layer checks if policy set 2 411 is set. Policy set 2 411 illustrates another scenario when the machine is not connected to a power outlet and is using battery power. Out of the four available interfaces, only UWB is enabled. The Ethernet and HPAV interface are not connected to the network and the 802.11n interface is disabled. Policy set 2 411 is set for optimization for energy usage since it is running on battery power. When policy set 2 411 is set, it follows the path 5b 413. If policy 2 411 is also not set, SPS layer 202 loops back to check policy set 1 410. One of ordinary skill in the relevant art may appreciate that many other policies set that are not described can be used.

Figure 5A:
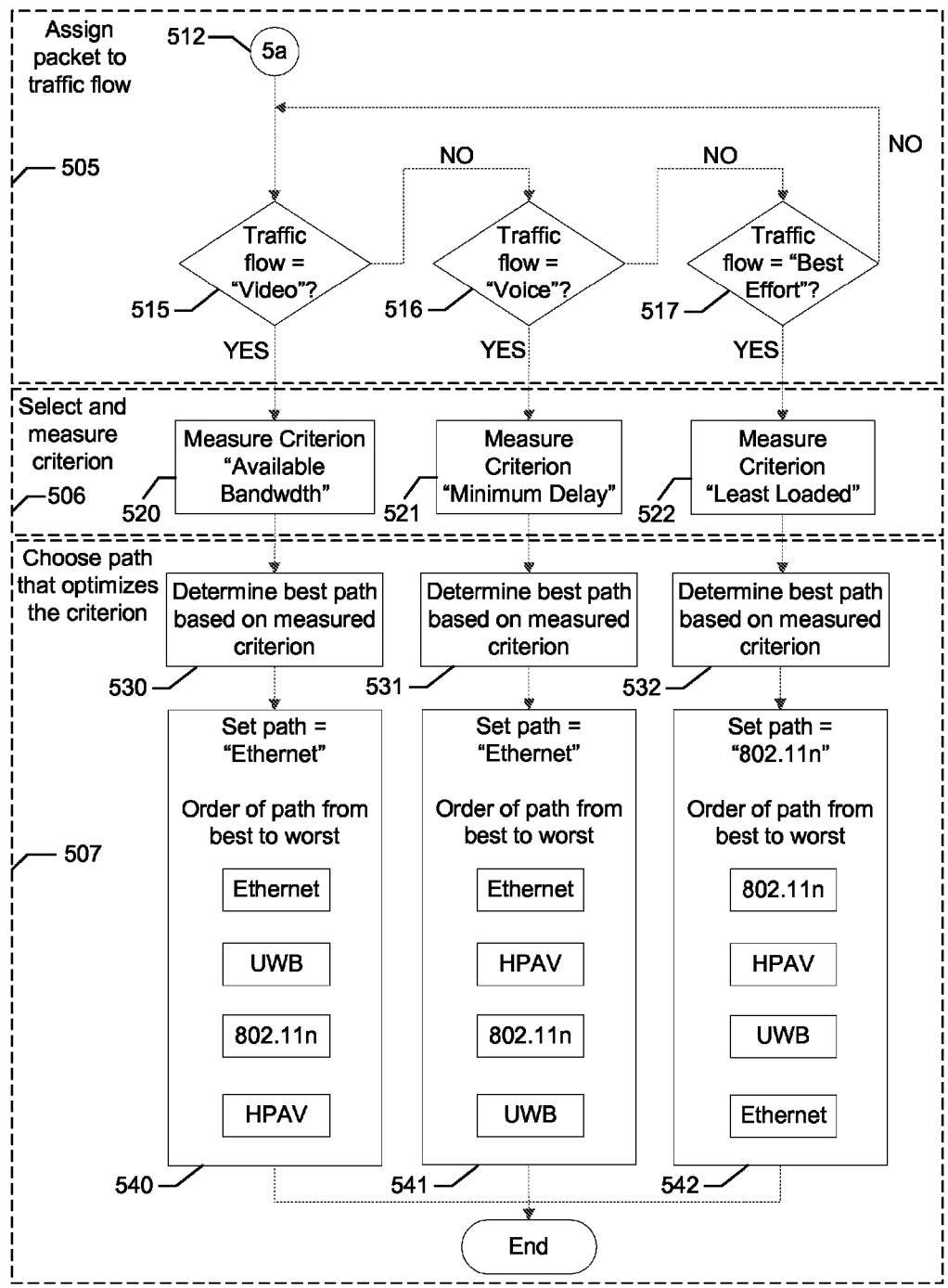
FIG. 5a is a flowchart according to an embodiment of the invention.
Figure 5B:
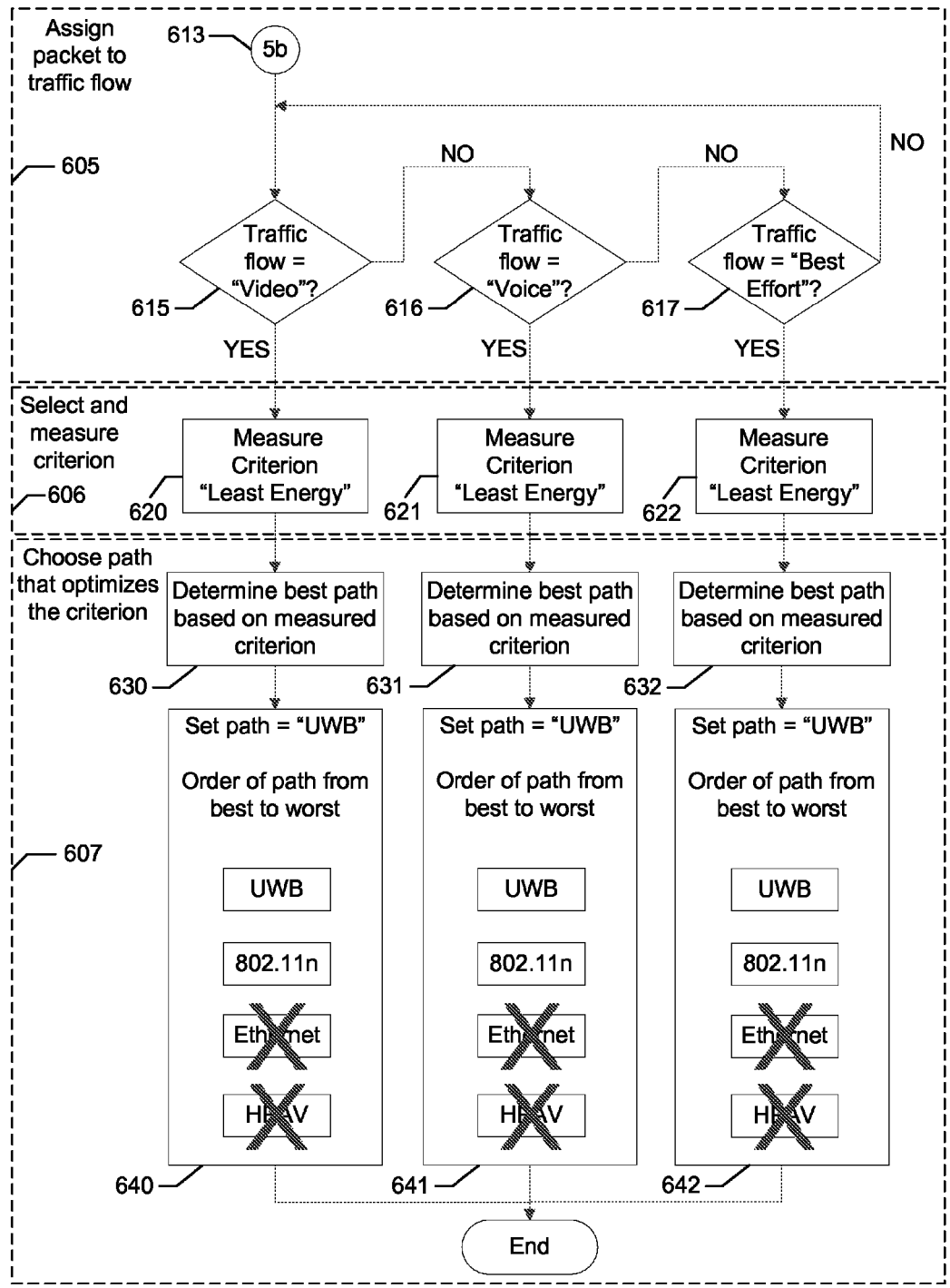
FIG. 5b is a flowchart according to an embodiment of the invention.

FIG. 5a shows the flowchart when policy set 1 410 is set. The traffic flow of the packet is assigned in step 505 by the data path processor 205. As described earlier, the data path processor determines from the source and destination port number of the packet to assign it to a traffic flow. In this embodiment, there are three types of traffic flow: video, voice and best effort. The policy engine 222 is set as optimization for performance in step 410. Therefore, for a video traffic flow 515, the criterion selected for measurement is the available bandwidth. Similarly, for a voice and a best effort traffic flow, the criterion selected is the minimum delay and the least loaded respectively. The selection of the criterion for this embodiment is based on how to measure a criterion that can best fulfill the policy requirements. The selection of the criterion for each traffic flow for this embodiment is not meant to be limiting. Various criteria can be set for each traffic flow depending on the set policy including, but are not limited to, available bandwidth, minimum delay, and least loaded or any other means of measuring the performance of a connection between two nodes in the networking system 100.

The process depicted in the flowchart first checks if the packet is assigned to a video traffic flow in step 515. If yes, the metric measurement module 224 selects and measures the criterion of available bandwidth in step 520. If not, the flow checks if the packet is assigned to a voice class in step 516. If yes, the metric measurement module 224 selects and measures the criterion of minimum delay in step 521. If not, the flow checks if the packet is assigned to a best effort class in step 517. If yes, the metric measurement module 224 selects and measures the criterion of least loaded in step 522. If not, the flowchart loops to check for the video traffic flow in step 515. One of ordinary skill in the relevant art may appreciate that many other traffic flows not described can be used. The traffic flow may include, but is not limited to, video, voice, best effort, or any other means of differentiating a packet from another.

When the criterion is selected as available bandwidth in step 520, the following step 530 determines the appropriate optimal path based on the measured criterion. Step 520 measures the available bandwidth in all the available paths between the source and destination node of the packet discovered by the path discovery module 221. By comparing the measured results of the criterion, the optimal path is determined and set in step 540. Step 540 illustrates an example where the four interfaces are listed in an order from best to worst according to the bandwidth available in each interface. In this illustration, the Ethernet connection has the highest measured bandwidth available, followed by UWB, 802.11n and HPAV. Therefore, the selected path is Ethernet as shown in Step 540. Similarly when the criterion selected is minimum delay in step 521, the path selection module 223 determines the appropriate optimal path based on the results of the minimum delay criterion in step 541. Step 531 measures the minimum delay in all the available paths between the source and destination node of the packet discovered by the path discovery module 221. By comparing the measured results of the criterion, the optimal path is determined and set in step 541. Step 541 illustrates an example where the Ethernet connection has the minimum measured delay, followed by HPAV, 802.11n and UWB. Therefore, the selected path is Ethernet as shown in Step 541. The same selection procedure happens when the criterion is selected as least loaded in Step 522. Step 532 determines the path with the least loaded communication path and sets the optimal path to 802.11n in Step 542.

FIG. 5b shows the process in a flowchart when policy set 2 411 is selected. The traffic flow of the packet is similarly assigned in step 605 as described earlier in the step 505. Since in this scenario, the machine is running on battery power, the primary concern is to use the least energy. Therefore, the policy engine 222 sets the criterion for all the traffic flows to the least energy as shown in 620, 621, and 622. The packet is similarly checked for video in step 615, for voice in step 616 and for best effort in step 617. As the only interface available in this scenario is UWB, therefore the measured criterion in steps 630, 631 and 632 would be UWB. The optimal path is set as UWB in steps 640, 641 and 642.

Although examples of the embodiments of the disclosed subject matter are described with reference to block and flow diagrams in FIGS. 1-4, 5a and 5b, one of ordinary skill in the relevant art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined. The control block 206 can also be implemented at higher layers for the invention to work.

In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the relevant art may appreciate that embodiments of the disclosed subject matter can be practiced with various computer network configurations, including multiple servers or clients and multiple wired or wireless communication paths. Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method of sending a packet from a source node to a destination node comprising:

associating the packet with a traffic flow, the traffic flow directed from the source node to the destination node in a same broadcast domain, wherein the source node is connected with the destination node via a first and a second communication path, wherein the first communication path operates with a communication protocol and the second communication path operates with another communication protocol in the same broadcast domain, the same broadcast domain being a logical network segment in which any network connected device in the same broadcast domain is capable of transmitting to any other network connected device in the same broadcast domain in a manner that bypasses transmission through a routing device that shares a same subnet address;

measuring a criterion for the first communication path and for the second communication path, wherein the criterion is based on an attribute of a policy setting;

selecting between the first and second communication paths based on the measured criterion, the selecting being performed at an intermediate layer that is intermediate to both a layer 2 and a layer 3, the intermediate layer including a layer 3 interface to interface to the layer 3, the layer 3 interface including a first network interface and a second network interface, the first network interface being a virtual network interface, the second network interface being a pseudo network interface, the first network interface and the second network interface appearing to the layer 3 as physical network interfaces, the first network interface corresponding to a single actual physical network interface, the second network interface corresponding to multiple actual physical network interfaces, the intermediate layer to determine for any data to be sent by the layer 3 through the second network interface one or more paths through one or more of the multiple actual physical network interfaces, other data sent by the layer 3 through the first network interface being sent via the single physical network interface;

assigning the selected communication path to the associated traffic flow; and sending the packet via the selected communication path.

2. The method of claim 1, wherein associating the packet with the traffic flow comprises:

determining a source port number and a destination port number in a header of the packet to associate the packet with the traffic flow.

3. The method of claim 2, wherein selecting between the first and second communication paths comprises:

updating a data path forwarding table with state information, wherein the state information include the source port number, the destination port number, and the selected communication path for the packet.

4. The method of claim 3, wherein selecting between the first and second communication paths comprises:

updating the data path forwarding table with the state information of an intermediate node between the source and destination node.

5. The method of claim 4, wherein selecting between the first and second communication paths comprises:

updating the data path forwarding table with state information of a reverse optimum communication path from the destination node to the source node.

6. The method of claim 4, wherein sending the packet via the selected communication path comprises:

accessing the data path forwarding table to obtain the source port number and the destination port number for sending the packet.

7. An apparatus comprising:

a data path processor to associate a packet to a traffic flow, and to send the packet via a selected communication path, wherein the traffic flow is directed from a source node to a destination node in a same broadcast domain; and a control block, communicatively coupled to the data path processor, further comprising:

a neighbor discovery module to find reachable nodes connected to the source node;

a path discovery module to find a first and a second communication path, wherein the source node is connected with the destination node via the first and the second communication path, wherein the first communication path is operable with a communication protocol and the second communication path is operable with another communication protocol in the same broadcast domain, the same broadcast domain being a logical network segment in which any network connected device in the same broadcast domain is capable of transmitting to any other network connected device in the same broadcast domain in a manner that bypasses transmission through a routing device that shares a same subnet address;

a policy engine module to select a criterion for the traffic flow, wherein the criterion is based on an attribute of a policy setting;

a metric measurement module to measure the criterion for the first communication path and for the second communication path; and a path selection module at an intermediate layer to select between the first and second communication paths based on the measured criterion, and to assign the selected communication path to the associated traffic flow, the intermediate layer being intermediate to both a layer 2 and a layer 3, the intermediate layer including a layer 3 interface to interface to the layer 3, the layer 3 interface including a first network interface and a second network interface, the first network interface being a virtual network interface, the second network interface being a pseudo network interface, the first network interface and the second network interface appearing to the layer 3 as physical network interfaces, the first network interface corresponding to a single actual physical network interface, the second network interface corresponding to multiple actual physical network interfaces, the intermediate layer to determine for any data to be sent by the layer 3 through the second network interface one or more paths through one or more of the multiple actual physical network interfaces, other data sent by the layer 3 through the first network interface being sent via the single physical network interface.

8. The apparatus of claim 7, wherein the data path processor is to determine a source port number and a destination port number in a header of the packet to associate the packet with the traffic flow.

9. The apparatus of claim 7, further comprising an interface block, communicatively coupled to a Transmission Control Protocol / Internet Protocol (TCP/IP) layer and the data path processor, to transfer the packet between the TCP/IP layer and the data path processor.

10. The apparatus of claim 7, further comprising a packet multiplexer, communicatively coupled to a Network Interface Card (NIC) layer, the data path processor and the control block, to transfer the packet from the data path processor to the NIC layer, wherein the NIC layer comprises at least one NIC.

11. The apparatus of claim 7, wherein the packet is a control packet or a data packet.

12. The apparatus of claim 8, wherein the path selection module is to update a data path forwarding table with state information, wherein the state information include the source port number, the destination port number, and the selected communication path for the packet.

13. The apparatus of claim 12, wherein the path selection module is further to update the data path forwarding table with the state information of an intermediate node between the source and destination node.

14. The apparatus of claim 12, wherein the path selection module is further to update the data path forwarding table with state information of a reverse optimum communication path from the destination node to the source node.

15. The apparatus of claim 12, wherein the data path processor is to access the data path forwarding table to obtain the source port number and the destination port number for sending the packet.

16. The apparatus of claim 9, wherein the interface block comprises:

a Virtual-NIC (V-NIC), to provide a pseudo NIC interface to the TCP/IP layer; and a Smart Path Selection-Network Interface Card (SPS-NIC) associated with at least two physical NICs, to provide a pseudo NIC interface to the TCP/IP layer.

17. The apparatus of claim 16, wherein the data path processor is further to associate a packet to a traffic flow when the packet originates from a SPS-NIC.

18. The apparatus of claim 7, wherein each of the communication protocol and the other communication protocol is to operate in accordance with one of Bluetooth, Ethernet, Institute of Electrical and Electronics Engineers (IEEE) 802.11n, Ultra Wide Band and HomePlug AV communication protocol.

19. A computer readable medium having instructions stored thereon which, when executed in a source node, results in performance of operations comprising:

associating a packet with a traffic flow, the traffic flow directed from the source node to a destination node in a same broadcast domain, wherein the source node is connected with the destination node via a first and a second communication path, wherein the first communication path is operable with a communication protocol and the second communication path is operable with another communication protocol in the same broadcast domain, the same broadcast domain being a logical network segment in which any network connected device in the same broadcast domain is capable of transmitting to any other network connected device in the same broadcast domain in a manner that bypasses transmission through a routing device that shares the same subnet address;

measuring a criterion for the first communication path and for the second communication path, wherein the criterion is based on an attribute of a policy setting;

selecting between the first and second communication paths based on the measured criterion, the selecting being performed at an intermediate layer that is intermediate to both a layer 2 and a layer 3, the intermediate layer including a layer 3 interface to interface to the layer 3, the layer 3 interface including a first network interface and a second network interface, the first network interface being a virtual network interface, the second network interface being a pseudo network interface, the first network interface and the second network interface appearing to the layer 3 as physical network interfaces, the first network interface corresponding to a single actual physical network interface, the second network interface corresponding to multiple actual physical network interfaces, the intermediate layer to determine for any data to be sent by the layer 3 through the second network interface one or more paths through one or more of the multiple actual physical network interfaces, other data sent by the layer 3 through the first network interface being sent via the single physical network interface;

assigning the selected communication path to the associated traffic flow; and sending the packet via the selected communication path.

20. The medium of claim 19, wherein each of the communication protocol and the other communication protocol operates in accordance with one of Bluetooth, Ethernet, Institute of Electrical and Electronics Engineers (IEEE) 802.11n, Ultra Wide Band and HomePlug AV communication protocol.

21. The medium of claim 19, wherein associating the packet with the traffic flow comprises:

determining a source port number and a destination port number in a header of the packet to associate the packet with the traffic flow.

22. The medium of claim 21, wherein selecting between the first and second communication paths comprises:

updating a data path forwarding table with state information, wherein the state information include the source port number, the destination port number, and the selected communication path for the packet.

23. The medium of claim 22, wherein selecting between the first and second communication paths further comprises:

updating the data path forwarding table with the state information of an intermediate node between the source and destination node.

24. The medium of claim 22, wherein selecting between the first and second communication paths further comprises:

updating the data path forwarding table with state information of a reverse optimum communication path from the destination node to the source node.

25. The medium of claim 22, wherein selecting between the first and second communication paths further comprises:

accessing the data path forwarding table to obtain the source port number and the destination port number for sending the packet.

26. The method of claim 1, wherein each of the communication protocol and the other communication protocol operates in accordance with one of Bluetooth, Ethernet, Institute of Electrical and Electronics Engineers (IEEE) wireless 802 standards, Ultra Wide Band and HomePlug AV communication protocol.

* * * * *